US007506132B2

(12) United States Patent
Arimilli et al.

(10) Patent No.: US 7,506,132 B2
(45) Date of Patent: Mar. 17, 2009

(54) VALIDITY OF ADDRESS RANGES USED IN SEMI-SYNCHRONOUS MEMORY COPY OPERATIONS

(75) Inventors: Ravi K. Arimilli, Austin, TX (US);
Rama K. Govindaraju, Hopewell Junction, NY (US); Peter H. Hochschild, New York, NY (US); Bruce G. Mealey, Austin, TX (US); Satya P. Sharma, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 11/315,757

(22) Filed: Dec. 22, 2005

(65) Prior Publication Data

US 2007/0150675 A1 Jun. 28, 2007

(51) Int. Cl.
*G06F 12/00* (2006.01)
(52) U.S. Cl. .................. 711/207; 711/162; 711/165; 711/205
(58) Field of Classification Search ............... 711/162, 711/163, 165, 207, 205; 710/22, 23
See application file for complete search history.

(56) References Cited

U.S. PATENT DOCUMENTS

| 4,797,812 | A | * | 1/1989 | Kihara | 710/26 |
| 5,377,337 | A | | 12/1994 | Antognini et al. | |
| 5,577,220 | A | | 11/1996 | Combs et al. | |
| 5,787,243 | A | * | 7/1998 | Stiffler | 714/13 |
| 6,088,773 | A | * | 7/2000 | Kano et al. | 711/161 |

(Continued)

FOREIGN PATENT DOCUMENTS

| JP | 63231652 | 3/1987 |
| JP | 10186967 | 12/1996 |

(Continued)

OTHER PUBLICATIONS

Appel, A.W., et al., "Real-Time Concurrent Collection on Stock Multiprocessors," Proceedings of the SIGPLAN '88 Conference on Programming Language Design and Implementation, Atlanta, Georgia, Jun. 22-24, 1988, ACM 0-89791-269-1/88/006/0011.

(Continued)

*Primary Examiner*—Matt Kim
*Assistant Examiner*—John P Fishburn
(74) *Attorney, Agent, or Firm*—Kevin M. Jordan; Jon A. Gibbons; Fleit Gibbons Gutman Bongini & Bianco P.L.

(57) ABSTRACT

A system, method, and a computer readable for protecting content of a memory page are disclosed. The method includes determining a start of a semi-synchronous memory copy operation. A range of addresses is determined where the semi-synchronous memory copy operation is being performed. An issued instruction that removes a page table entry is detected. The method further includes determining whether the issued instruction is destined to remove a page table entry associated with at least one address in the range of addresses. In response to the issued instruction being destined to remove the page table entry, the execution of the issued instruction is stalled until the semi-synchronous memory copy operation is completed.

6 Claims, 7 Drawing Sheets

U.S. PATENT DOCUMENTS

| | | | |
|---|---|---|---|
| 6,622,263 B1 * | 9/2003 | Stiffler et al. | 714/13 |
| 6,738,870 B2 | 5/2004 | Van Huben et al. | |
| 6,810,489 B1 * | 10/2004 | Zhang et al. | 714/6 |
| 6,981,104 B2 * | 12/2005 | Prabhu | 711/144 |
| 7,225,316 B2 * | 5/2007 | Thadani | 711/202 |
| 7,263,580 B2 * | 8/2007 | Kiba et al. | 711/113 |
| 2002/0078307 A1 | 6/2002 | Zahir | |
| 2002/0169938 A1 | 11/2002 | Scott et al. | |

OTHER PUBLICATIONS

Li, K., et al., "Evaluation of Memory System Extensions," ACM 0-89791-394-9/91/0005/0084.

Tzou, S.Y., et al., "The Performance of Message-Passing Using Restricted Virtual Memory Remapping," Software—Practice and Experience, vol. 21, Issue 3, 1991 by John Wiley & Sons, Ltd., pp. 251-267.

Tezuka, H., et al., "Pin-down Cache: A Virtual Memory Management Technique for Zero-Copy Communication," Proceedings of the First Merged International Parallel Processing Symposium & Symposium on Parallel and Distributed Processing, Mar. 30—Apr. 3, 1998, Orlando, Florida.

"Discriminatory DASD Input/Output," IBM Technical Disclosure Bulletin, vol. 38, No. 7, Jul. 1995.

* cited by examiner

VALIDITY OF ADDRESS RANGES USED IN SEMI-SYNCHRONOUS MEMORY COPY OPERATIONS

CROSS REFERENCE TO RELATED APPLICATION

This application is related to the inventors' application "CACHE INJECTION USING SEMI-SYNCHRONOUS MEMORY COPY OPERATION" Ser. No. 11/316,070, now and inventor's application "EFFICIENT AND FLEXIBLE MEMORY COPY OPERATION" Ser. No. 11/316,663, now U.S. Pat. No. 7,454,585 both of which were filed on the same day as the present application and commonly assigned herewith to International Business Machines Corporation. These two related applications are incorporated herein by reference in their entirety.

FIELD OF THE INVENTION

The present invention generally relates to the field of information processing systems, and more particularly relates to memory copying operations within the information processing system.

BACKGROUND OF THE INVENTION

A memory copying operation is a very often performed data processing operation. Such operations are initiated by software at the applications level, at the operating system (OS) level, and by middleware programming. Memory copying operations are typically programmed with repeated load and store operations that copy data from one location in memory to another location. This causes the data transfer to be staged through the Central Processing Unit (CPU or, more simply, "processor"). This results in inefficiency in the overall operation of the data processing system for the following reasons:

(1) the performance of the copy operation is limited by the memory bandwidth available, which is often insufficient to match the speed of the CPU;

(2) the data transfer is staged through the CPU via load and store instructions, essentially tying up the CPU for the duration of the move operation which stalls the CPU from working on other tasks;

(3) because the CPU is typically much faster than the memory subsystem, the CPU is idle as it waits for data to arrive from memory into the CPU.

As can be seen from the above discussion, memory copy operations are performance sensitive procedures for applications, middleware and operating systems. Many methods for performing memory copy operations cause the data to be staged through a CPU by means of repeated load and store instructions. As indicated above, operations of this nature tie up the CPU for a relatively long duration of time, especially when large amounts of data are to be copied. Such operations are also slow since memory latency and memory bandwidth limitations result in slower overall transfer rates as compared to CPU speeds, thereby resulting in undesirable levels of performance.

However, some solutions do exist for memory copy operations in real mode for pinned pages (and hence real memory addresses), but none exist for general use by applications, by middleware and by operating systems. In other words, when a data processor is functioning in a virtual addressing mode, efficient memory copy operations are simply not possible or tolerated. Up until the advent of the present invention, it is only when real addressing modes are employed that efforts were undertaken to improve memory copy operation efficiency, and even then "pinning of pages" is required. Pinning is when memory is configured to prevent paging out of the data stored in that portion of memory. This ensures that page faults do not occur for data access to the temporary buffer.

Another problem is that typical implementations of the store operation cause the destination cache line to be fetched from memory even though the entire cache line is ultimately rewritten. This also wastes undesirably large portions of the memory bandwidth.

Another source of inefficiency in traditional memory copying is poor data alignment. Typical computer systems are more efficient when loading and storing naturally aligned data. They are also more efficient when loading and storing larger granules of data (for example, 64-bit operations are more efficient than 32-bit operations). Unfortunately a large class of application software does not behave well when it comes to the natural alignment of data with respect to the memory subsystem. Instead, most application software relies on operating system (OS) instructions, such as bcopy or similar instructions, to effect memory copy operations. The bcopy routine has no knowledge of the application alignment behavior and must be designed to work efficiently under all alignment conditions.

Therefore a need exists to overcome the problems with the prior art as discussed above.

SUMMARY OF THE INVENTION

Briefly, in accordance with the present invention, disclosed are a system, method, and computer readable medium for protecting content of a memory page. The method includes determining a start of a semi-synchronous memory copy operation. A range of addresses is determined where the semi-synchronous memory copy operation is being performed. An issued instruction that removes a page table entry is detected. The method further includes determining whether the issued instruction is destined to remove a page table entry associated with at least one address in the range of addresses. In response to the issued instruction being destined to remove the page table entry, the execution of the issued instruction is stalled until the semi-synchronous memory copy operation is completed.

In another embodiment of the present invention, a system for protecting content of a memory page is disclosed. The system comprises a processor with at least one source register and at least one target register coupled thereto. A memory that is communicatively couple to the processor is also included. A first opcode, which is interpreted by the processor, for a semi-synchronous memory copy operation is included. A source address range associated with the semi-synchronous memory copy operation is stored in the at least one source register and a target address range associated with the semi-synchronous memory copy operation is stored in the at least one target register. The system further comprises a second opcode, which is interpreted by the processor, for removing a memory page table entry. An address comparator for comparing a set of addresses associated with the second opcode with the source address range and the target address range associated with the semi-synchronous memory copy operation is included. The processor, in response to the set of addresses associated with the second opcode corresponding to at least one of the source address range and the target address range associated with the semi-synchronous memory copy operation, stalls the execution of the second opcode until the semi-synchronous memory copy operation is completed.

In yet another embodiment of the present invention, a computer readable medium for protecting content of a memory page is disclosed. The computer readable medium comprises instructions for determining a start of a semi-synchronous memory copy operation. A range of addresses is determined where the semi-synchronous memory copy operation is being performed. An issued instruction that removes a page table entry is detected. The method further includes determining whether the issued instruction is destined to remove a page table entry associated with at least one address in the range of addresses. In response to the issued instruction being destined to remove the page table entry, the execution of the issued instruction is stalled until the semi-synchronous memory copy operation is completed.

An advantage of the foregoing embodiments is that they provide a memory copy operation that allows the processor to continue executing subsequent instructions during the memory copy operation thereby avoiding unnecessary processor downtime. Another advantage of the present invention is that because the memory copy instruction takes effective (virtual) addresses as arguments, the virtual memory pages being referenced by the source and target of the memory copy instruction are not pinned and can tolerate page faults. This allows for the overhead of pinning pages a priori to be avoided. Yet another advantage of the present invention is that the memory copy instruction does not impose constraints on the alignment of the addresses, which are passed to it as instruction arguments. A further advantage of the present invention is that by using cache injection combined with data perfecting memory latency can be avoided.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The terms "memory copy operation" and "memory copy", as used herein, is a process carried out within an information processing system in which the data in one portion of its random access memory is copied to another portion of the same random access memory without changing the memory contents of the source storage locations. However, in an exemplary embodiment of the present invention, the term "memory copy" refers to memory copy operations involving the copying of many kilobytes or even megabytes of data.

The present invention, according to an embodiment, overcomes problems with the prior art by providing a more efficient mechanism for memory copy operations. The present invention allows the processor to continue executing subsequent instructions during a memory copy operation thereby avoiding unnecessary processor downtime.

Exemplary Processor

Figure 1:
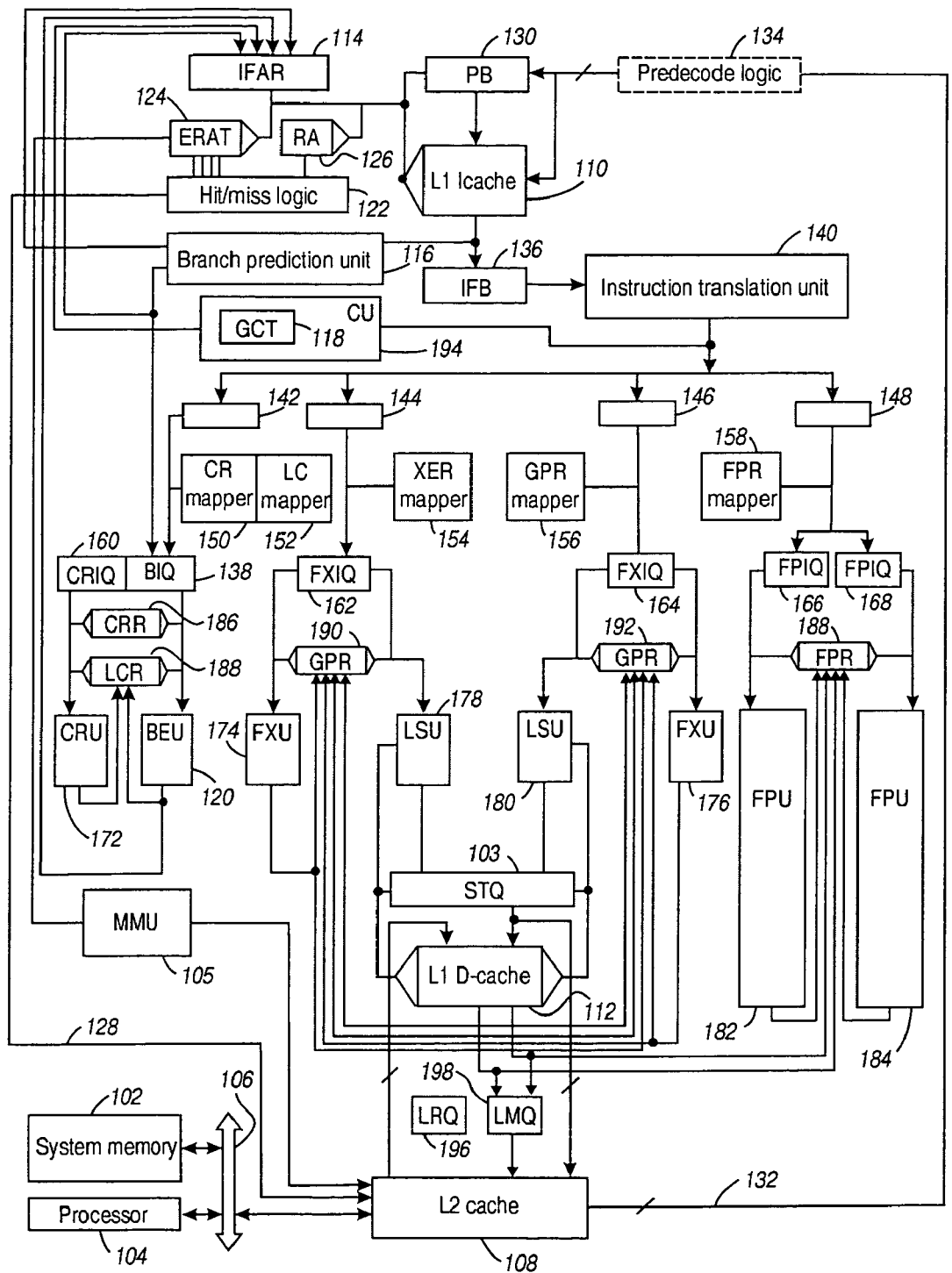
FIG. 1 is block diagram illustrating an exemplary processor for processing instructions according to an embodiment of the present invention.

According to an embodiment of the present invention, as shown in FIG. 1, an exemplary processor, generally designated 100, for processing instructions and data in accordance with the present invention is illustrated. Processor 100 comprises a single integrated circuit processor such as a superscalar processor, which, as discussed further below, includes various execution units, registers, buffers, memories, and other functional units that are all formed by integrated circuitry.

As illustrated in FIG. 1, processor 100 may be coupled to other devices, such as a system memory 102 and, in one embodiment, a second processor 104, by an interconnect fabric 106 to form a larger data processing system such as a computer system. Processor 100 has an on-chip multi-level cache hierarchy including, for example, a unified level two ("L2") cache 108 and bifurcated level one ("L1") instruction ("I") and data ("D") caches 110, 112, respectively. As is well known to those skilled in the art, caches 108, 110, 112 provide low latency access to cache lines corresponding to memory locations in the system memory 102.

Instructions are fetched for processing from the L1 I-cache 110 in response to the effective address ("EA") residing in an instruction fetch address register ("IFAR") 114. During each cycle, a new instruction fetch address may be loaded into the IFAR 114 from one of three sources: a branch prediction unit ("BPU") 116, which provides speculative path addresses resulting from the prediction of conditional branch instructions, a group completion table ("GCT") 118, an in completion unit ("CU") 118 which provides non-speculative path addresses, and a branch execution unit ("BEU") 120, which provides non-speculative addresses resulting from the resolution of incorrectly predicted conditional branch instructions. If the hit/miss logic 122 determines, after translation of the EA contained in the IFAR 114 by effective-to-real address translation ("ERAT") 124 and lookup of the real address ("RA") in the I-cache directory 126, that the cache line of instructions corresponding to the EA in the IFAR 114 does not reside in the L1 I-cache 110, then the hit/miss logic 122 provides the RA to the L2 cache 108 as a request address via I-cache request bus 128. Such request addresses may also be generated by prefetch logic within the L2 cache 108 based upon recent access patterns. In response to a request address, the L2 cache 108 outputs a cache line of instructions, which are loaded into the prefetch buffer ("PB") 130 and the L1 I-cache reload bus 132, possibly after passing through the optional predecode logic 134.

Once the cache line specified by the EA in the IFAR 114 resides in the L1 cache 110, the L1 I-cache 110 outputs the cache line to both the branch prediction unit ("BPU") 116 and to the instruction fetch buffer ("IFB") 136. The BPU 116 scans the cache line of instructions for branch instructions and predicts the outcome of conditional branch instructions, if any. Following a branch prediction, the BPU 116 furnishes a speculative instruction fetch address to the IFAR 114, as discussed above, and passes the prediction to the branch instruction queue ("BIQ") 138 so that the accuracy of the prediction can be determined when the conditional branch instruction is subsequently resolved by the branch execution unit 120.

The IFB 136 temporarily buffers the cache line of instructions received from the L1 I-cache 110 until the cache line of instructions can be translated by the instruction translation unit ("ITU") 140. In the illustrated embodiment of the processor 100, the ITU 110 translates instructions from user instruction set architecture ("UISA") instructions into a possibly different number of internal ISA ("IISA") instructions that are directly executable by the execution units of the processor 100. Such translation may be performed, for example, by reference to microcode stored in a read-only memory ("ROM") template. In at least some embodiments, the UISA-to-IISA translation results in a different number of IISA instructions than UISA instructions and/or IISA instructions of different lengths than corresponding UISA instructions. The resultant IISA instructions are then assigned by a group completion table 118 to an instruction group, the members of which are permitted to be dispatched and executed out-of-order with respect to one another. The group completion table 118 tracks each instruction group for which execution has yet to be completed by at least one associated EA, which is preferably the EA of the oldest instruction in the instruction group.

Following UISA-to-IISA instruction translation, instructions are dispatched to one of the latches 142, 144, 146, 148, possibly out-of-order, based upon instruction types. That is, the branch instructions and other condition register ("CR") modifying instructions are dispatched to the latch 142, fixed-point and load-store instructions are dispatched to either of the latches 144, 146, and floating-point instructions are dispatched to the latch 148. Each instruction requiring a rename register for temporarily storing execution results is then assigned one or more rename registers by the appropriate CR mapper 150, link and count ("LC") register mapper 152, exception register ("XER") mapper 154, general-purpose register ("GPR") mapper 156, or floating-point register ("FPR") mapper 158.

The dispatched instructions are then temporarily placed in an appropriate CR issue queue ("CRIQ") 160, branch issue queue ("BIQ") 138, fixed-point issue queues ("FXIQs") 162, 164, or floating-point issue queues ("FPIQs") 166, 168. From the issue queues 160, 138, 162, 164, 166, 168, instructions can be issued opportunistically to the execution units of the processor 100 for execution as long as data dependencies and anti-dependencies are observed. The instructions, however, are maintained in the issue queues 160, 138, 162, 164, 166, 168 until execution of the instructions is complete, and the result data, if any, are written back, in case any of the instructions needs to be reissued.

As illustrated, the execution units of the processor 100 include a CR unit ("CRU") 172 for executing CR-modifying instructions, a branch execution unit ("BEU") 120 for executing branch instructions, two fixed-point units ("FXUs") 174, 176 for executing fixed-point instructions, two load-store units ("LSUs") 178, 180 for executing load and store instructions, and two floating-point units ("FPUs") 182, 184 for executing floating-point instructions. Each of execution units 172, 120, 174, 176, 178, 180, 182, 184 is preferably implemented as an execution pipeline having a number of pipeline stages.

During execution within one of the execution units 172, 120, 174, 176, 178, 180, 182, 184, an instruction receives operands, if any, from one or more architected and/or rename registers within a register file coupled to the execution unit. When executing CR-modifying or CR-dependent instructions, CRU 172 and BEU 120 access the CR register file 186, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater zero, or equal to zero. The link and count register ("LCR") register file 188 contains a count register ("CTR"), a link register ("LR") and rename registers of each, by which the BEU 120 may also resolve conditional branches to obtain a path address. General-purpose register files ("GPRs") 190, 192, which are synchronized, duplicate register files, store fixed-point and integer values accessed and produced by FXUs 174, 176 and LSUs 178, 180. The Floating-point register file ("FPR") 158, which like the GPRs 190, 192 may also be implemented as duplicate sets of synchronized registers, contains floating-point values that result from the execution of floating-point instructions by FPUs 182, 184 and floating-point load instructions by the LSUs 178, 180.

After an execution unit finishes execution of an instruction, the execution unit writes the result to the designated destination as specified by the instruction and removes the instruction from the issue queue, notifies the CU 186, which schedules completion of instructions in program order. To complete an instruction executed by one of the CRU 172, FXUs 174, 176, or FPUs 182, 184, the CU 194 signals the execution unit, which writes back the result data, if any, from the assigned rename register(s) to one or more architected registers within the appropriate register file. Once all instructions within its instruction group have completed, it is removed from the GCT 118. Other types of instructions, however, are completed differently.

When the BEU 120 resolves a conditional branch instruction and determines the path address of the execution path that should be taken, the path address is compared against the speculative path address predicted by the BPU 116. If the path addresses match, no further processing is required. If, however, the calculated path address does not match the predicted path address, the BEU 120 supplies the correct path address to the IFAR 114. In either event, the branch instruction can then be removed from the BIQ 138, and when all other instructions within the same instruction group have completed, from the GCT 118.

Following execution of a load instruction, the effective address computed by executing the load instruction is translated to a real address by a data ERAT (not illustrated) and then provided to the L1 D-cache 112 as a request address. At this point, the load instruction is removed from either the FXIQ 162, 164 and placed in load reorder queue ("LRQ") 196 until the indicated load is performed. If the request address misses in the L1 D-cache 112, the request address is placed in the load miss queue ("LMQ") 198, from which the requested data is retrieved from the L2 cache 108, and failing that, from another processor 104 or from the system memory 102. The LRQ 196 snoops exclusive access requests (e.g., read-with-intent-to-modify), flushes or kills on the interconnect fabric 106 against loads in flight, and if a hit occurs, cancels and reissues the load instruction Store instructions are similarly completed utilizing a store queue ("STQ") 103 into which effective addresses for stores are loaded following execution of the store instructions. From the STQ 103, data can be stored into either or both of the L1 D-cache 112 and the L2 cache 108. The processor 100 also includes a memory management unit ("MMU") 105. The MMU 105 comprises various components for handling memory accesses requested by the processor. For example, the memory management unit 202 includes a translation look-aside buffer ("TLB") to which includes parts of the page table (included in the MMU 105) for translating virtual addresses into real addresses. The MMU 105 also includes components for memory protection and cache control.

Exemplary Memory Copy Mechanism

Figure 2:
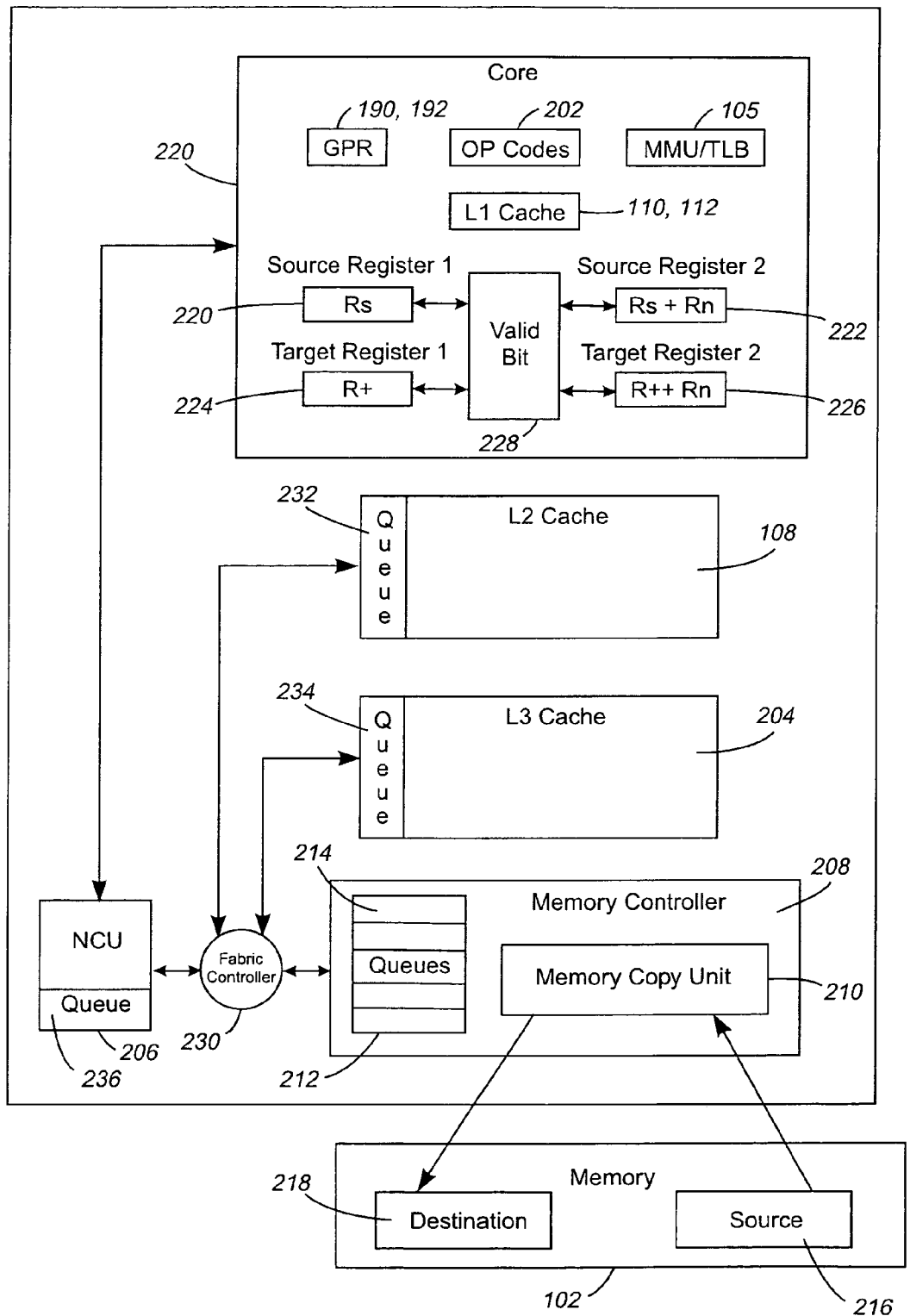
FIG. 2 is a block diagram illustrating a more simplified version of the processor of FIG. 1 including an exemplary memory copying mechanism according to an embodiment of the present invention.

FIG. 2 is a block diagram illustrating a more simplified view of the processor in FIG. 1 including an exemplary memory copy mechanism according to an embodiment of the present invention. FIG. 2 shows the processor core 100 including the GPR 190, 192; LI cache 110, 112; and the MMU/TLB 105. The processor 100 also includes opcodes 202 such as the exemplary memory copy instruction of the present invention.

The new memory copy instruction ("mc") is added to the processor 100 instruction architecture for providing an efficient and flexible means for copying data from a first portion of memory to a second portion of memory. The memory copy operation of the present invention operates semi-synchronously with the processor. In other words, the processor can execute subsequent instructions during the memory copy operation. However, the memory copy instruction preserves temporal persistence of validity for virtual source and target addresses corresponding to source and target locations in the memory 102, respectively. In one embodiment of the present invention, the memory copy instruction includes the following syntax/semantics: mc RT, RS, RN.

The RT register includes the effective (virtual) address of the target memory location for the memory copy operation. The RS register includes the effective (virtual) address of the source memory location for the memory copy operation. The RN register includes the number of bytes to be transferred in the memory copy operation. In one embodiment, the memory copy instruction also includes a cache injection ("CI") register that includes information for identifying one or more levels of cache that are to receive a predefined number of data lines. For example, the CI register, in one embodiment, indicates that the first few data lines are to be copied to the L1 cache 112, the next ten lines are to be copied to the L2 cache 108, and the next 20 lines are to be copied to the L3 cache 204. The number of data lines to be copied varies based on the individual information processing system. For example, the number of data lines, in one embodiment, is controlled by the system to reflect the best cache hit possibility with minimum pollution of the working set in the cache. The system allocates the number of data lines for the instruction stream and the current state of the cache.

It should be noted that the description of the instruction format as "mc RT, RS, RN" contains several arbitrarily specified items including the name and abbreviation for the instruction opcode as well as the names and abbreviations for the indicated registers. The opcode only needs to be uniquely identifiable and associated with a memory copy operation; likewise, while it is required that virtual (that is, effective) starting addresses and ending addresses be provided to the instruction, the names and syntactical positioning of their abbreviations is not at all critical; and the same is true of the RN reference to the number of bytes of data to be transferred. Additionally, the value associated with the RN reference label can also refer to another quantity of data to be transferred rather than to "bytes of data"; for example, it could also refer to "words" of data, where a word might constitute a value such as 32 bits.

The memory copy instruction is enqueued via a non-cacheable unit ("NCU") 206 to a memory controller (MC) 208. For example, the NCU 206 allows the memory copy instruction to be enqueued directly into the memory instruction queue 212 without first being loaded into the L1 cache 110. A fabric controller 230 such as a crossbar switch arbitrates communication with the memory controller between the NCU 230, the L2 cache 108, and the L3 cache 204. The fabric controller 230 also couples the L2 cache 108, L3 cache 204, and the NCU 206 to one another. Each of the L2 cache 108, L3 cache 204, and the NCU 206 include a queue 323, 234, 236 for queuing data to be communicated to the memory controller 208.

The memory instruction queue 212 includes memory copy instructions 214. The memory copy instruction queue 210, in one embodiment, is designed to be able to accommodate as many memory copy instructions in parallel to saturate available memory bandwidth. The memory copy unit 210 performs the memory copy operation according to the memory copy instruction. For example, data is copied from a source address 216 to the destination address 218 of the memory 102.

The core 100 also includes source registers 220, 222 and target registers 224, 226 that are utilized by the semi-synchronous memory copy operation. A valid bit 228 is associated with the address within the registers 220, 222, 224, 226. In one embodiment, multiple semi-synchronous memory copy operations can be performed and each semi-synchronous has its own pair of source and target registers and valid bit associated with it. Address ranges associated with these registers 220, 222, 224, 226 are protected. For example, during a memory copy operation the valid bit 228 is set for the source address range Rs, Rs+Rn and the target address range Rt, Rt+Rn. If a store operation tries to write to the address range Rs, Rs+Rn while the memory copy operation is being executed, e.g. while the valid bit 228 is set, the store instruction will be blocked or stalled until the memory copy operation is completed. Load operations for reading from the address range Rs, Rs+Rn are allowed. If a store or load operation tries to read/write to the address range Rt, Rt+Rn while the memory copy operation is being executed, e.g. while the valid bit 228 is set, the both the load or store instruction will be blocked or stalled until the memory copy operation is completed, e.g. the valid bit 228 is no longer set for the address range Rt, Rt+Rn.

One advantage of the present invention is that memory pages associated with the address ranges in the source registers 220, 222 and the target registers 224, 226 are prevented from being paged without being pinned. For example, the address ranges within the source registers 220, 222 and the target registers 224, 226 are compared with address ranges that are targeted by instructions for memory paging. If the address ranges within the source registers 220, 222 and the target registers 224, 226 are targeted by a memory paging instruction such as a translation look-aside buffer invalidate entry ("tlbie") instruction, this instruction will be stalled until the memory copy operation associated with the address ranges is completed. For example, In the event of a page table update, the update is stalled by the processor 100 until all pending memory operations are completed (that is, an implicit synchronization instruction is issued) and the Translation Lookaside Buffer ("TLB") entries are not modified until the memory copy is complete (that is, an implicit translation look-aside buffer invalidate entry ("tlbie") instruction is issued).

Exemplary Process of Enqueuing the Memory Copy Operation

Figure 3:
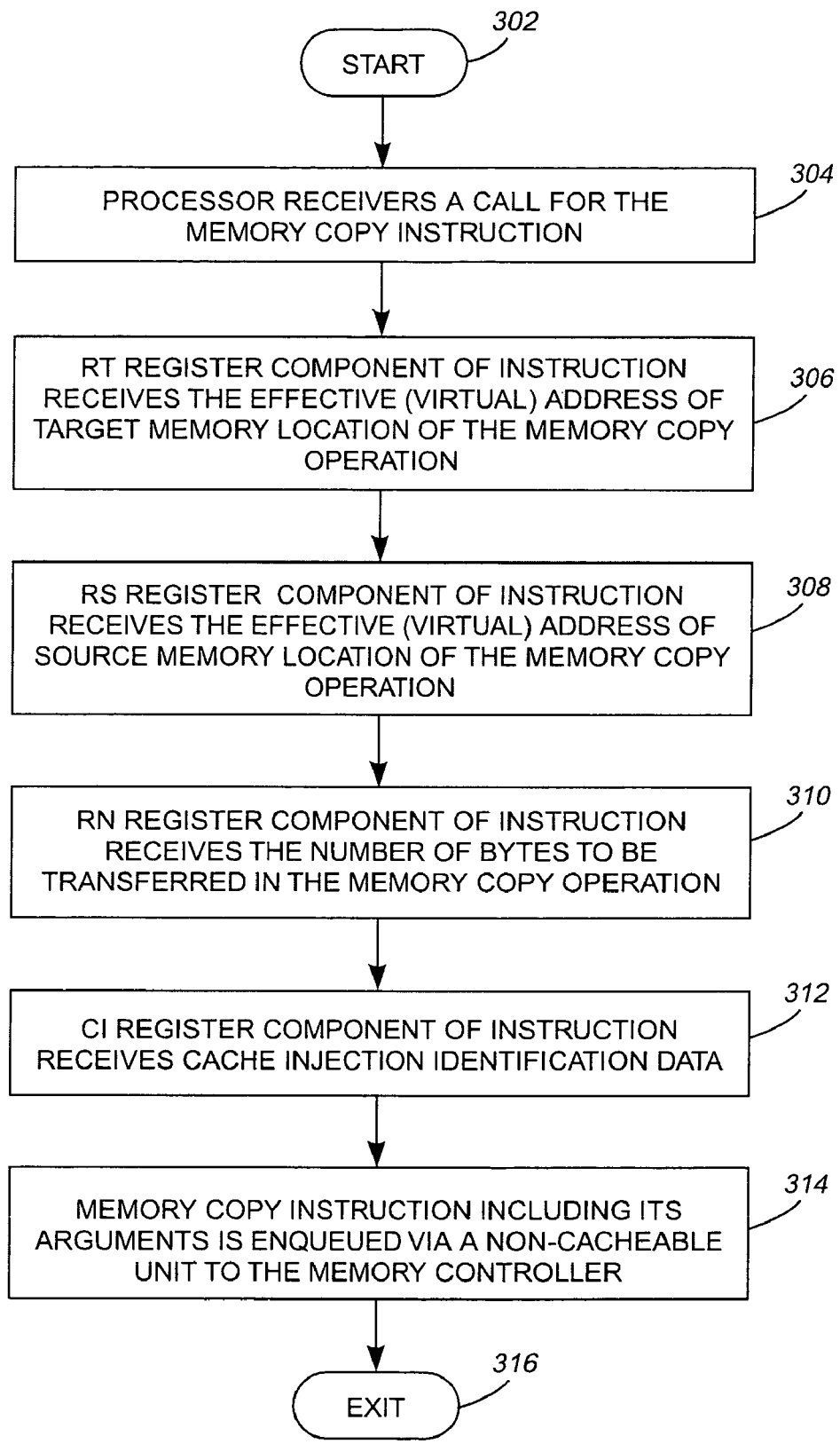
FIG. 3 is an operational flow diagram illustrating an exemplary process of enqueuing an exemplary memory copy operation to a memory controller according to an embodiment of the present invention.

FIG. 3 is an operational flow diagram illustrating a process of enqueuing an exemplary semi-synchronous memory copy operation to a memory controller 208. The operational flow diagram of FIG. 3 begins at step 302 and flows directly to step 304. The processor 100 receives a call for the memory copy operation. For example, user code calls the memory copy instruction and passes arguments to the memory copy instruction. A target register ("RT") component of the memory copy instruction, at step 306, receives the effective (virtual) address of the target memory location for the memory copy operation from the user code. A source register ("RS") component of the memory copy instruction, at step 308, receives the effective (virtual) address of the source memory location for the memory copy operation from the user code.

A byte register ("RN") component of the memory copy instruction, at step 310, receives the number of bytes to be transferred in the memory copy operation. A cache injection register ("CI") component of the memory copy instruction, at step 312, receives data indicating whether destination data is to be copied to cache or memory. After all of the parameters of the memory copy instruction are received, the instruction, at step 314, is enqueued to the memory controller 208 via the non-cacheable unit 206. The control flow then exits at step 316.

One advantage of the present invention is that because the memory copy instruction takes effective (virtual) addresses as arguments, the virtual memory pages being referenced by the source and target of the memory copy instruction are not pinned and can tolerate page faults. This allows for the overhead of pinning pages a priori to be avoided. Another advantage of the present invention is that the memory copy instruction does not impose constraints on the alignment of the addresses, which are passed to it as instruction arguments.

Figure 4:
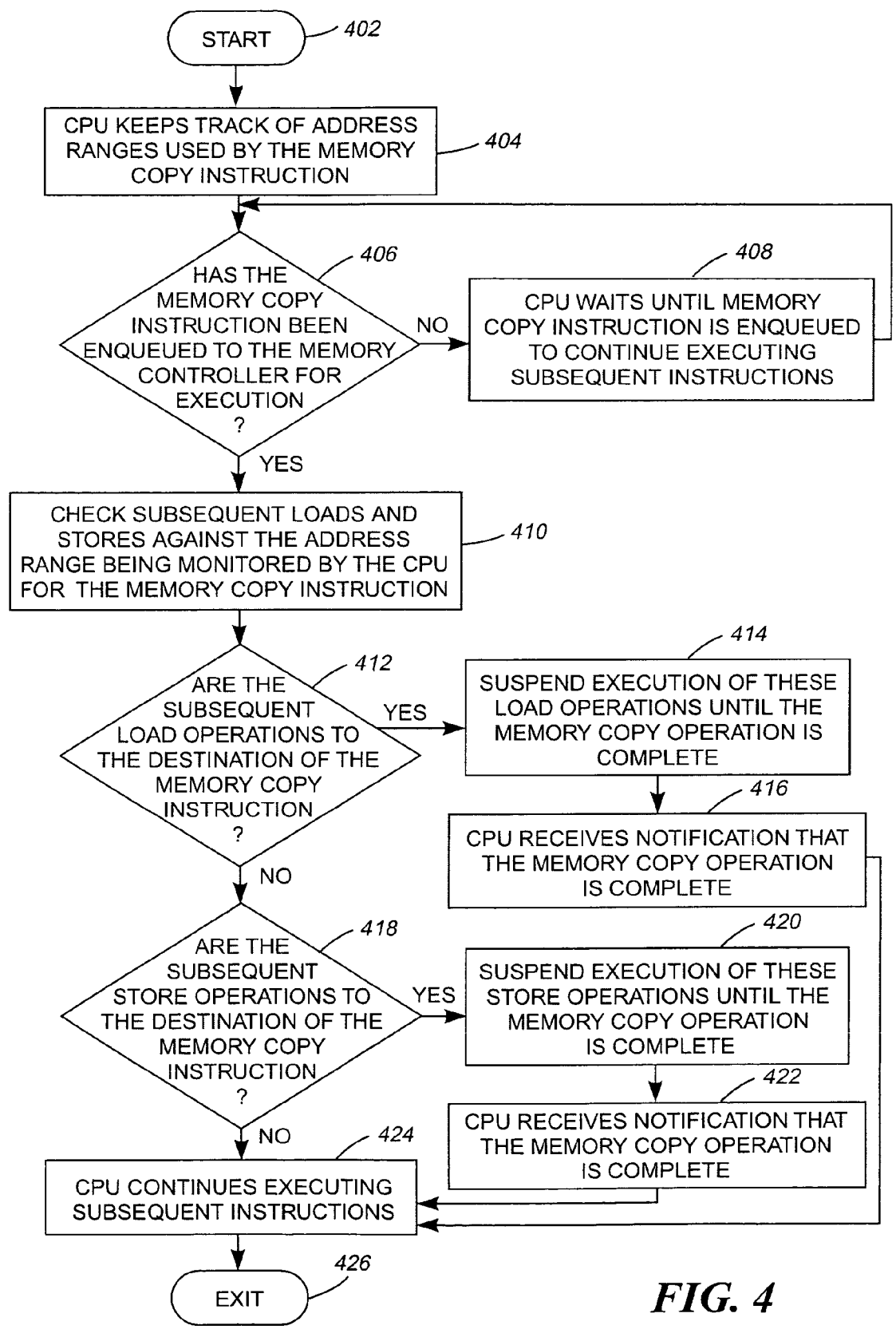
FIG. 4 is an operational flow diagram illustrating an exemplary semi-synchronous memory copy operation according to an embodiment of the present invention.

FIG. 4 is an operational flow diagram illustrating the semi-synchronous attributes of the exemplary memory copy instruction. The operational flow diagram of FIG. 4 begins at step 402 and flows directly to step 404. The processor 100, at step 404, monitors the address ranges used by the memory copy instruction. It is noted that this is not imposing any new requirement on the processor-memory subsystem but rather it piggybacks on existing functions and conventions of the processor 100. The processor 100, at step 406, determines whether the memory copy instruction has been enqueued to the memory controller 208 for execution. For example, the exemplary memory copy operation is semi-synchronous with the processor core 100, thereby allowing the processor core 100 to execute subsequent instructions during the memory copy operation.

If the result of this determination is negative, the processor 100, at step 408, waits until the memory copy instruction is enqueued to continue executing subsequent instructions. If the result of this determination is positive, the processor 100, at step 410, checks subsequent loads and stores against the address ranges being used for the memory copy instruction, e.g. the address ranges in the source registers 220, 222 and the target registers 224, 226. For example, subsequent loads and stores to locations in memory that do not overlap with the source and destination addresses of the memory copy instruction proceed uninhibited.

The processor 100, at step 412, determines whether the subsequent load operations are to the destination of the memory copy instruction. If the result of this determination is positive, the processor 100, at step 414, suspends execution of these load operations until the memory copy operation is completed. For example, during the memory copy operation the valid bit 228 is set for the source address range Rs, Rs+Rn and the target address range Rt, Rt+Rn. If a store or load operation tries to read/write to the address range Rt, Rt+Rn while the memory copy operation is being executed, e.g. while the valid bit 228 is set, the both the load or store instruction will be blocked or stalled until the memory copy operation is completed, e.g. the valid bit 228 is no longer set for the address range Rt, Rt+Rn. When the memory copy operation is completed, the processor 100, at step 416, receives a notification that the memory copy operation is complete. The processor 100, at step 424, then continues to execute the subsequent instructions as they become available from an instruction pipeline.

If the result of the determination at step 412 is negative, the processor 100, at step 418 determines whether the subsequent store operations are to the source and/or destination of the memory copy instruction. If the result of this determination is positive, the processor, at step 420, suspends execution of these store operations until the memory copy operation is complete. Comparing the address ranges of load/store operations to the address ranges (Rs to Rs+Rn, Rt to Rt+Rn) associated with the memory copy operation protects the memory copy address ranges for the duration of the memory copy operation. In other words the temporal persistence of validity of the memory copy address ranges is preserved. When the memory copy operation is completed, the processor 100, at step 420, receives a notification that the memory copy operation is completed.

The semi-synchronous memory copy operation of the present invention avoids the need for a complex mechanism of notifying the user of completion of the memory copy operation, for instance by associating memory copy instructions with tags and having the user issue a wait instruction on the tag to ensure completion. In one embodiment, when the memory copy operation is completed, a "mover done" pulse is sent to the core 100 and the valid bit 228 is turned off. This signals the processor that the memory copy operation is complete. If the result of the determination at step 418 is negative, the processor 100, at step 424, then continues to execute the subsequent instructions. The control flow then exits at step 426, By stalling store operations to the source of the memory copy instruction or load/stores to the destination of the memory copy instruction until the memory copy operation is completed, the processor 100 is treating the memory copy instruction as a sequence of store instructions in terms of the coherency and consistency rules of the processor 100. This aspect is important in that it allows overlap of computation with the memory copy operation while ensuring that other memory operations are preserved and consistent with a sequence of store operations.

In one embodiment of the present invention, the processor architecture requires that load/store operations be performed in a predetermined order (sequential consistency). Therefore, whether or not a load/store operation is targeted at the address ranges within the source registers 220, 222 or the target registers 224, 226, load/store operations are blocked/stalled during the semi-synchronous memory copy operation. In another embodiment, the processor architecture requires that only store operations be performed in a predefined order (intermediate consistency). Therefore, the targeted address of a store operation is compared to the address range of the source registers 220, 222. If the targeted address is within the address range of the source registers 220, 222, the store operation is blocked/stalled until the semi-synchronous memory copy operation is completed. In an additional embodiment, the processor architecture does not require that load/store operations be performed in a predetermined order (weak consistency). Therefore, both the targeted addresses of load/store operations are compared to the source registers 220, 222 and the target registers 224, 226 as discussed above with respect to FIG. 4

Another advantage of the present invention is that page boundary limitations are not required. However, middleware and byte level copy ("bcopy") functions that would like to exploit the efficiency of the memory copy instruction of the present invention can break up the copy function so as not to cross page boundaries (both for the source and destination). In other words, the memory copy instruction, in one embodiment, is invoked in a loop for memory copies that span multiple page boundaries. This is actually a good design point given the constraint that, for a page table update, all pending memory operations are first completed. If the size of the memory copy is unconstrained it can result in one process with a large memory copy monopolizing the system resources thereby impacting fairness aspects of the operating system.

Another advantage of the present invention is that programming instructions and programming semantics used by a programmer do not need to change to implement the various embodiments of the present invention.

It should be noted that this mechanism can be tuned for different page sizes so as to ensure efficient memory copying operations as well as for allowing fairness in the use of system resources by processes. Additionally, it is noted that since source and destination addresses may be at different offsets within their respective pages, this means that "address shifting" is carried out so as to more desirably align the offsets for efficient memory copy.

Exemplary Process of Issuing Multiple Memory Copy Instructions

Figure 5:
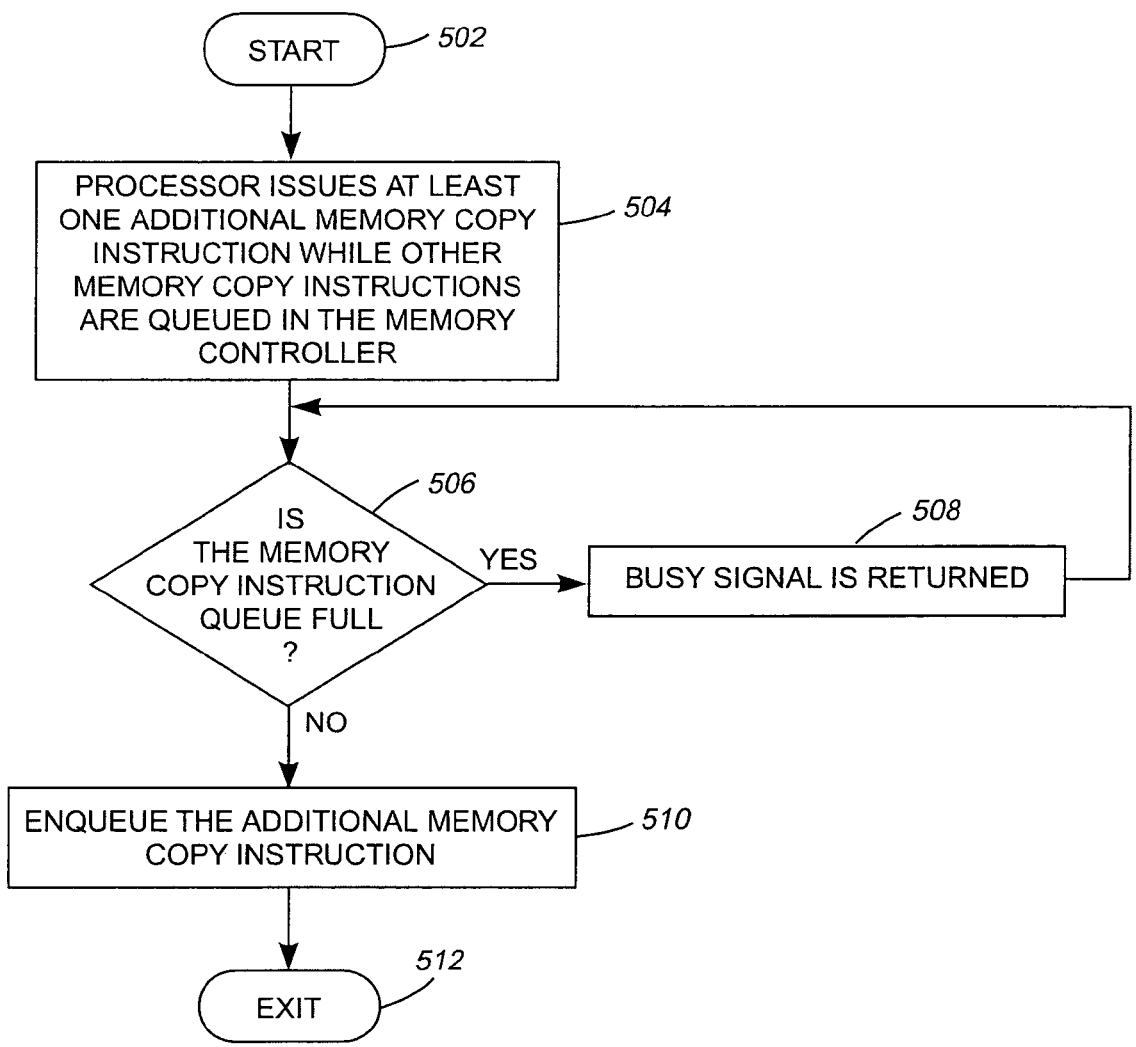
FIG. 5 is an operational flow diagram illustrating an exemplary process of issuing multiple memory copy instructions according to an embodiment of the present invention.

FIG. 5 is an operational flow diagram illustrating an exemplary process of issuing multiple memory copy instructions in a pipelined fashion. The operational flow diagram of FIG. 5 begins at step 502 and flows directly to step 504. After at least one memory copy instruction has been enqueued to the memory controller 208, the processor 100, at step 504, issues at least one additional memory copy instruction. The memory controller 208, at step 506, determines if the memory copy instruction queue 212 is full. If the result of this determination is positive, a busy signal, at step 508, is returned to the processor 100. For example, the memory copy instruction can return with a condition code indicating that the resource is busy.

In another embodiment, the memory copy instruction is stalled until the memory copy instruction queue 212 has enough space for the newly issued memory copy instruction. The present invention is able to be configured to implement various methods of indicating that the memory copy instruction queue is full. One advantage of stalling is that it ensures "order fairness" for accessing memory copy resources. In one embodiment, if a busy signal is returned, the operation is retried with the implication that in a loaded system, some of the processes can get starved out for the memory copy resource. Additionally, if a busy signal is returned the application requesting the memory copy operation has the potential to do other work while it waits for the memory copy instruction queue 212 to be freed up.

If the result of the determination at step 506 is negative, the additional memory copy instruction, at step 510, is enqueued to the memory copy instruction queue 212. The control flow then exits at step 512. The memory copy instruction queue 212, in one embodiment, is designed to be able to accommodate as many memory copy instructions in parallel to saturate available memory bandwidth. Even if the queue 212 is deeper than the available memory bandwidth, the overlapping of memory copy instructions with subsequent instructions still produces tangible benefits to running applications. If the source and destination address ranges overlap, the contents of the overlapping region of the memory copy instruction, in one embodiment, are undefined and a programming error typically occurs. However, in an alternative embodiment of the present invention overlapping source and destination address ranges do not cause programming errors. In this embodiment, data from a source address is allowed to be copied to a destination address, but a warning of possible corruption is given to the programmer.

Exemplary Process of Cache Injection

Figure 6:
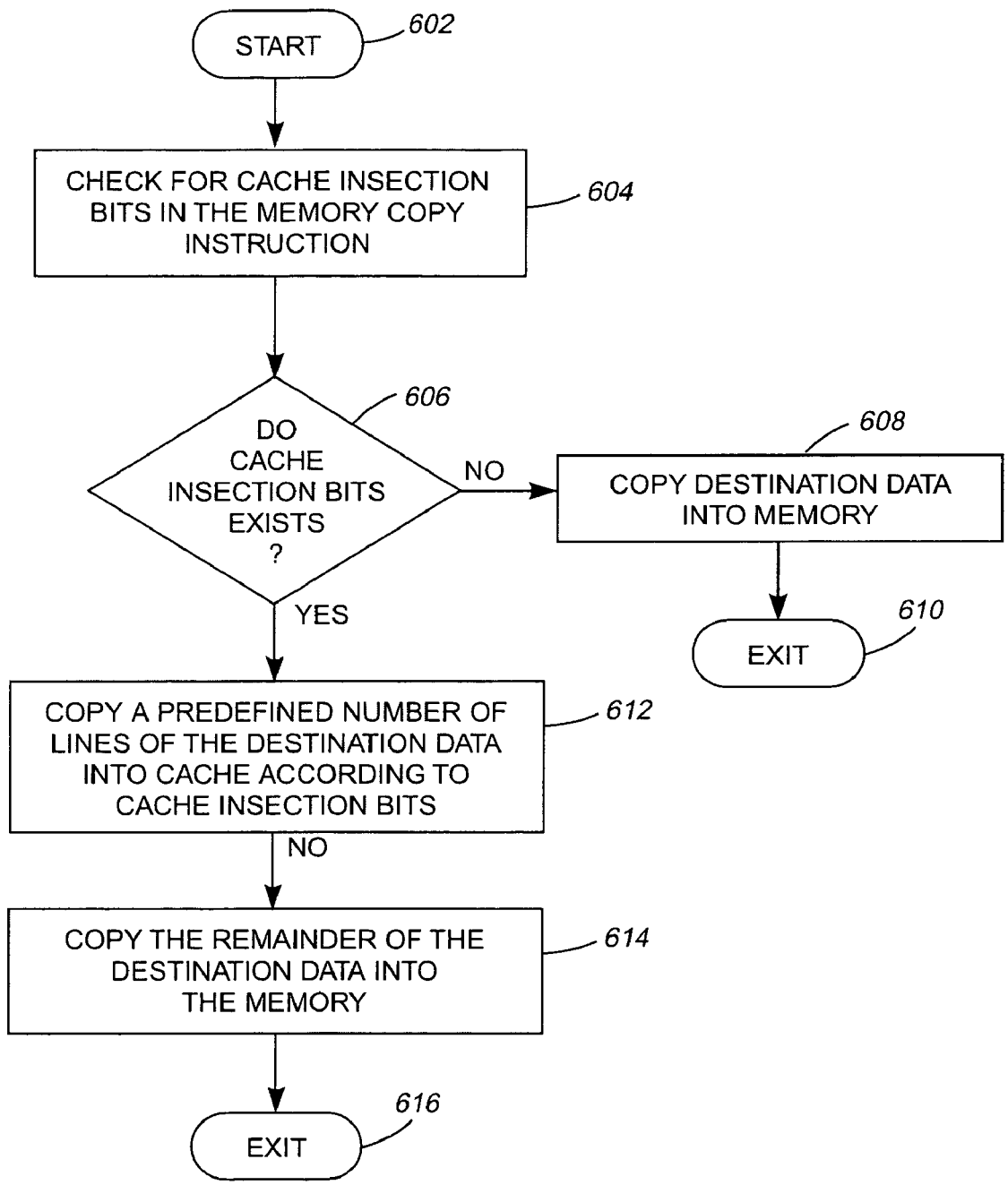
FIG. 6 is an operational flow diagram illustrating an exemplary process of cache injection of destination data according to an embodiment of the present invention.

FIG. 6 is an operational flow diagram illustrating an exemplary process of cache injection of destination data based on information in the cache injection registers of the memory copy instruction. The operational flow diagram of FIG. 6 begins at step 602 and flows directly to step 604. The processor 100, at step 604, checks the memory copy instruction for cache injection bits. Cache injection bits, for example, are located in a separate register of the instruction or can alternatively be located in the RN register of the instruction. Cache injection bits indicate to the memory copy unit 210 where to copy all or some of the data. For example, for faster processing of the data, the memory copy instruction includes cache bits so that when the processor loads the data, it is loaded from cache instead of memory.

If the cache bits are determined, at step 606, not to exist, the memory copy unit 210, at step 608, copies the destination data into memory 102. The control flow then exits at step 610. If cache bits are determined, at step 606, to exist, the memory copy unit 210, at step 612, copies a predefined number of lines of the destination data into the appropriate level of cache as indicated by the cache injection bits. For example, a few lines can be moved to the level 1 cache 112, the next ten lines copied to the level 2 cache 108, and the next twenty lines are copied to the level 3 cache 204. This way, the upper level of the caches is not corrupted. The number of lines to be copied into cache, for example, is varied based on the information processing system. A copy of the destination data, at step 614, is copied into the memory 102. One advantage of cache injection is that when combined with data perfecting memory latency can be avoided.

It is also noted that the results of memory copy operations are often used in different ways. In many cases the data in the destination memory is used immediately by the processor for consumption in subsequent instructions. An example of such a usage mode is moving a data file from a user buffer after a read operation. In such cases it is useful for the processor 100 to upload the destination data into cache for consumption by the processor 100. In other cases, such as moving data from user buffers to network buffers to be transferred via Direct Memory Access ("DMA") into the network (or I/O device) the destination data is placed in memory (that is, it is not cached) for the DMA operation to proceed.

Exemplary Process of Blocking a TLBIE Instruction

Figure 7:
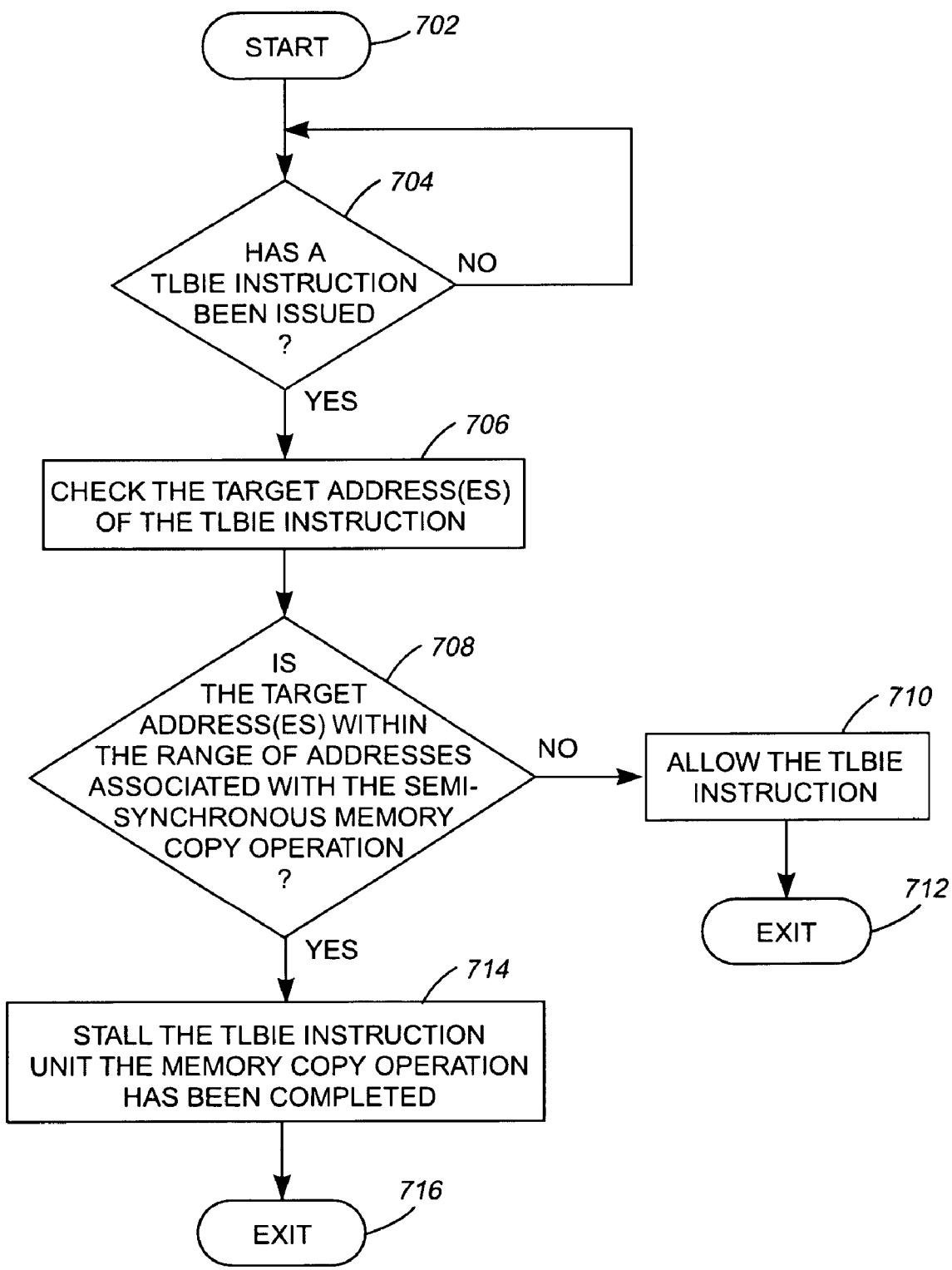
FIG. 7 is an operational flow diagram illustrating an exemplary process of blocking a translation lookaside buffer invalidate entry instruction, according to an embodiment of the present invention.

FIG. 7 is an operational flow diagram illustrating an exemplary process of blocking a translation lookaside buffer invalidate entry instruction during the semi-synchronous memory copy operation. The operational flow diagram of FIG. 7 begins at step 702 and flows directly to step 704. The processor 100, at step 704, determines whether a tlbie instruction has been issued. If the result of this determination is negative, the processor continues, at step 704, to determine if a tlbie instruction has been issued. If the result of this determination is positive, the processor 100, at step 706 checks the addresses targeted by the tlbie instruction.

The processor 100, at step 708, determines if the addresses target by the tlbie instruction are within the range of addresses associated with the semi-synchronous memory copy operation. For example, the processor 100 compares the addresses targeted by the tlbie instruction with the address ranges found within the source and target registers 220, 222, 224, 226. If the result of this determination is negative, the processor 100, at step 710, allows the tlbie instruction to execute. If the result of this determination is positive, the processor 100, at step 714, stalls the tlbie instruction until the memory copy operation has been completed. The control flow then exits at step 716.

The exemplary process of FIG. 7 is also applicable to other instructions involved in memory paging. By stalling a tlbie instruction targeted at address associated with the semi-synchronous memory copy operation, the addresses are protected from being page-out. In other words, temporal persistence of validity for the addresses within the source and destination registers 220, 222, 224, 226 is preserved. The addresses do not have to be pinned, which is expensive.

Non-Limiting Examples

The foregoing embodiments of the present invention are advantageous because they provide a memory copy operation that allows the processor to continue executing subsequent instructions during the memory copy operation thereby avoiding unnecessary processor downtime. Another advantage of the present invention is that because the memory copy instruction takes effective (virtual) addresses as arguments, the virtual memory pages being referenced by the source and target of the memory copy instruction are not pinned and can tolerate page faults. This allows for the overhead of pinning pages a priori to be avoided. Yet another advantage of the present invention is that the memory copy instruction does not impose constraints on the alignment of the addresses, which are passed to it as instruction arguments. A further advantage of the present invention is that by using cache injection combined with data perfecting memory latency can be avoided.

The present invention can be realized in hardware, software, or a combination of hardware and software. A system according to a preferred embodiment of the present invention can be realized in a centralized fashion in one computer system or in a distributed fashion where different elements are spread across several interconnected computer systems.

Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method in a superscalar processor for protecting content of a memory page, the method comprising:

determining a start of a semi-synchronous memory copy operation associated with a memory, wherein the semi-synchronous memory copy operation is an operation that operates semi-synchronously with the superscalar processor to provide maximum processor utilization such that the superscalar processor is able to execute at least one additional instruction on the memory during the semi-synchronous memory copy operation on the memory, and wherein the semi-synchronous memory copy operation is an operation that preserves temporal persistence of validity by stalling at least one operation that conflicts with the semi-synchronous memory copy operation to be performed by the superscalar processor, wherein the operation to be stalled is associated with at least one of a source location and a target location being operated on during the semi-synchronous memory copy operation;

determining a range of addresses where the semi-synchronous memory copy operation is being performed;

detecting an issued instruction that removes a page table entry;

determining that the issued instruction is destined to remove a page table entry associated with at least one address in the range of addresses; and in response to determining that the issued instruction is destined to remove the page table entry, stalling an execution of the issued instruction by the superscalar processor until the semi-synchronous memory copy operation is completed.

2. The method of claim 1, wherein the issued instruction is a translation lookaside buffer invalidate entry instruction.

3. The method of claim 1, further comprising:

preventing write operations to the range of addresses where the semi-synchronous memory copy operation is being performed.

4. The method of claim 1, further comprising:

allowing a read operation from a source area within the range of addresses where the semi-synchronous memory copy operation is being performed.

5. The method of claim 1, further comprising:

preventing a read operation from a target area within the range of addresses where the semi-synchronous memory copy operation is being performed.

6. The method of claim 1, wherein stalling entry preserves temporal persistence of validity for range of addresses where the semi-synchronous memory copy operation is being performed.

* * * * *